United States Patent [19]

Shigeta et al.

[11] 4,027,958
[45] June 7, 1977

[54] SYSTEM FOR CONTROLLING REPRODUCTION OF AUDIO TAPE IN SYNCHRONISM WITH PROJECTION OF VIDEO FILM

[75] Inventors: Yoshihiro Shigeta, Toyko; Kuniyoshi Suzaki, Machida; Mitsutoshi Ogiso, Kawasaki, all of Japan

[73] Assignee: Canon Kabushiki Kaisha, Tokyo, Japan

[22] Filed: Aug. 21, 1975

[21] Appl. No.: 606,643

Related U.S. Application Data

[63] Continuation of Ser. No. 397,806, Sept. 17, 1973, abandoned.

[30] Foreign Application Priority Data

Sept. 22, 1972 Japan .............................. 47-95302

[52] U.S. Cl. .................. 353/26 A; 352/17; 353/15
[51] Int. Cl.[2] .................. G03B 31/00; G03B 23/06
[58] Field of Search ............... 353/15, 25, 26, 120; 352/17, 20, 31; 35/8 A

[56] References Cited

UNITED STATES PATENTS

| | | | |
|---|---|---|---|
| 3,181,421 | 5/1965 | Nimke et al. .......................... | 352/17 |
| 3,539,248 | 11/1970 | Lancor ................................. | 352/17 |
| 3,584,396 | 6/1971 | Hannal et al. ........................ | 35/9 A |
| 3,609,019 | 9/1971 | Tuber .................................. | 352/17 |
| 3,692,390 | 3/1970 | Siegel ................................. | 352/17 |
| 3,700,320 | 10/1972 | Brewer et al. ........................ | 353/26 |
| 3,731,063 | 5/1973 | Bickl et al. .................. | 235/61.11 E |
| 3,744,890 | 7/1973 | Suzuki et al. ........................ | 353/26 |
| 3,768,897 | 10/1973 | Spani .................................. | 353/26 |

Primary Examiner—Richard E. Aegerter
Assistant Examiner—John W. Shepperd
Attorney, Agent, or Firm—Fitzpatrick, Cella, Harper & Scinto

[57] ABSTRACT

A system is disclosed for retrieving a film having video information recorded thereupon in synchronism with a magnetic tape having audio information recorded thereupon and for synchronizing the sound with the picture after retrieval. Address signals are recorded upon both the film and the tape. The system comprises detectors for address signals recorded upon the film and the tape, a computer including a keyboard for retrieving a desired address, comparators for comparing the outputs of the detectors with the output of the computer, and means for transporting the film and tape in response to the outputs of the comparators. Control signals are recorded upon both the tape and film for synchronizing the sound with the picture. When the control signal recorded upon the film is detected, the still picture is projected and when the control signal recorded on the tape is detected the motion picture is projected.

33 Claims, 16 Drawing Figures

SYSTEM FOR CONTROLLING REPRODUCTION OF AUDIO TAPE IN SYNCHRONISM WITH PROJECTION OF VIDEO FILM

This is a continuation, of application Ser. No. 397,806 filed Sept. 17, 1973 now abandoned.

BACKGROUND OF THE INVENTION

1. Field of the Invention

The present invention relates to a system for synchronizing the sound reproduced from a magnetic tape with the picture projected from a film by utilizing an electronic computer.

2. Description of the Prior Art

Various prior art systems for synchronizing the sound reproduced from a magnetic tape with the picture projected from a film are generally of the type in which the control signals recorded upon the film or tape are detected by a projector or tape recorder to attain the syncrhonization of the sound with the picture. There have been also proposed various audiovisual equipments of the type reproducing the sound in synchronization with the picture, but there must be provided a very complex mechanism for selectively reproducing the sound or projecting the picture or controlling the fast forward, and fast rewind of the magnetic tape and film simultaneously or independently of each other or controlling the still picture projection.

SUMMARY OF THE INVENTION

In view of the above one of the objects of the present invention is to provide a system incorporating a small-sized electronic computer for synchronizing the sound reproduced from a magnetic tape with the picture projected from a film in a very simple manner. Briefly stated, the system of the present invention is charaterized by an electronic computer capable of entering therein the addresses of the images to be projected as well as the addresses of the audio signals associated with the images; counters adapted to count the addresses of the image and of the associated audio signals, respectively; comparator means for comparing the output signal of said computer with the output signals of said counters, respectively; control means for changing the mode of reproduction of the audio signals in synchronism with the projection of the associated images in response to the outputs of said comparator means and means for controlling the output signal of said computer, whereby the transport of the magnetic tape and the film may be controlled in response to the outputs of said control means.

The above and other objects, features and advantages of the present invention will become more apparent from the following description of one preferred embodiment thereof taken in conjunction with the accompanying drawings.

DESCRIPTION OF THE PREFERRED EMBODIMENT

Figure 1:
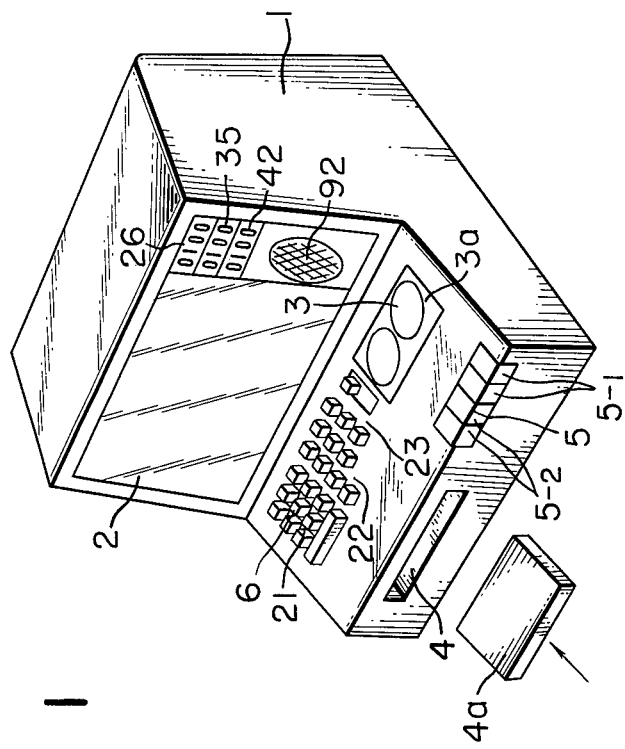
FIG. 1 is a perspective view of an audiovisual equipment incorporating the system of the present invention.

Referring to FIG. 1 illustrating an audiovisual system incorporating the present invention, reference numeral 1 designates a main body or housing; 2, a translucent screen; 3, a recess for receiving a magnetic tape or tape cassette 3a; 4, a recess for receiving film or film cassette 4a; 5, tape and film operation buttons; and 6, a keyboard used for retrieving the tape and film and for starting and stopping them.

Figure 2:
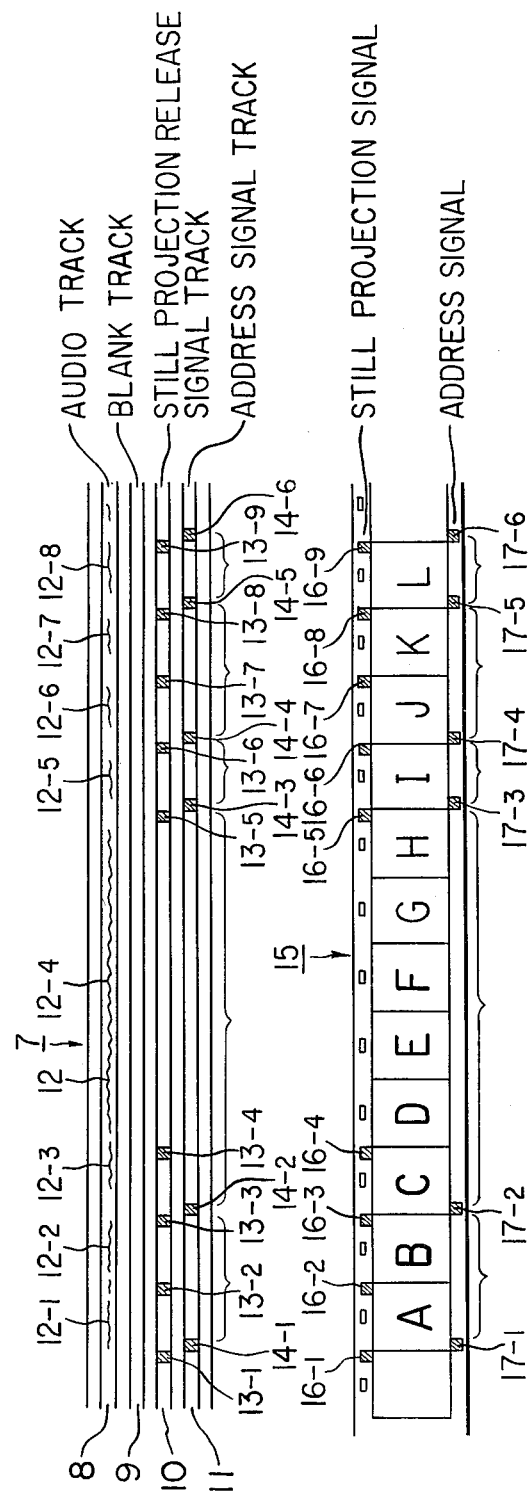
FIG. 2 illustrates various signals recorded upon a magnetic tape and a film in accordance with the present invention.

Referring to FIG. 2, a magnetic tape generally indicated by 7 has four tracks 8, 9, 10 and 11. Audio signals 12-$n$ are recorded on the first track 8. No signal is recorded on the second track 9, but the narration in foreign language corresponding to the audio signals 12-$n$ or the signals to be described hereinafter are to be recorded. Still-projection-release signals 13-$n$ are recorded on the third track 10, and on the fourth track 11 are recorded address signals 14-$n$ which may be used for retrieving the desired audio signals.

Upon a video signal film generally indicated by 15 and outside of frames are recorded still-projection signals 16-$n$ in response to which the motion picture projection is switched to the still-picture projection, and address signals 17-$n$ are used for retrieving the desired frame.

Figure 3:
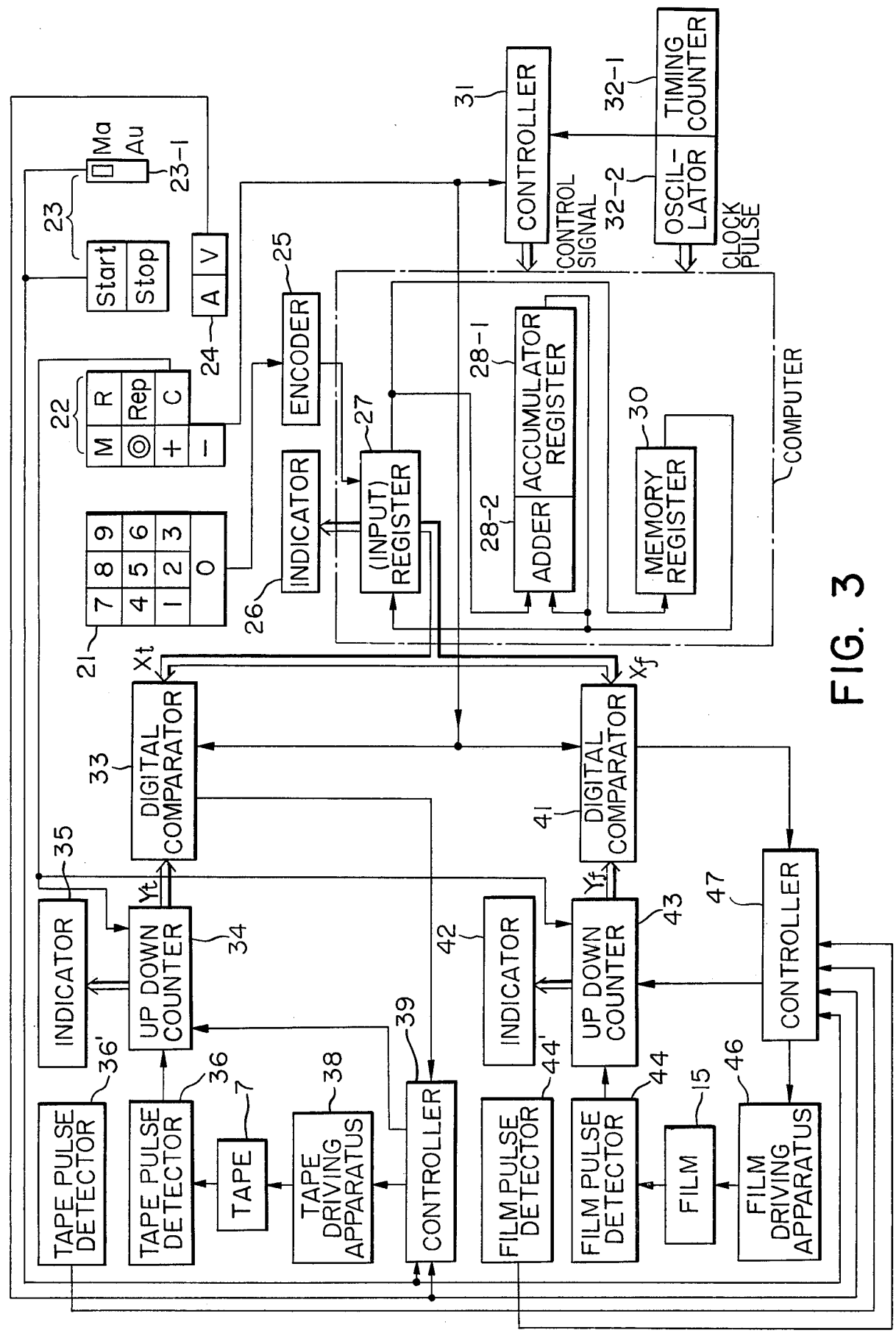
FIG. 3 is a block diagram of the system in accordance with the present invention.

Next referring to FIG. 3 illustrating in block diagram of the control system of the audiovisual equipment or system in accordance with the present invention, reference numerals 21, 22, 23 and 24 designate key groups on the keyboard 6 shown in FIG. 1. The key group 21 consisting of 10 numeric keys is used to key in addresses. A key marked as ⊚ in the key group 22 is used to retrieve the address keyed in by the key group 21 and stored in an input register 27; keys marked with + and − are used to increase or decrease the address of the image being projected, which is stored in an input register 27, by a number keyed in by the key group 21; a key marked with M is a memory key for storing the address of the image being projected, which is stored in the input register 27; a key marked with R is a recall key for recalling the address which is stored by depressing the memory key M; a key marked with Rep is a repeat key for repeating the projection of a desired image; and a key marked with C is a clear key for clearing all of indicators to be described hereinafter, the input register 27 and tape and film signal counters to be described hereinafter. The above functional keys constitute command signal input means.

Switching means or key group 23 consists of an automatic-manual selection key 23-1, a start key and a stop key. When the selection key 23-1 is switched to the automatic mode, the tape is transported independently of the address signals 14-n recorded thereupon so that the projection of the images or pictures is synchronized with the reproduction of the audio signals. The start key is used to start the tape again after it has been stopped, and the stop key is used to stop the tape. Audio-video switching means 24 is used to operate the magnetic tape or film independently of each other. The input register 27, which is connected through an encoder 25 to the keys 21, is connected to an indicator 26 which displays the content of the input register 27, an adder 28-2 and a memory register 30. The adder 28-1 is connected to an accumulator 28-1. The command or functional keys 22 are connected to a controller 31 which applies the control signals to a computer and is connected to a clock pulse generator or oscillator 32-2 and to a timing counter 32-1.

Detectors 36 and 36' are adapted to detect the address signals 14-n and the still-projection-release signals 13-n recorded on the magnetic tape (see FIG. 2). The tape pulse detector 36 is connected to an up-down counter 34 which in turn is connected to an indicator 35 for displaying the content of the counter 34 on the screen 2 (see FIG. 1) and to one input terminal $Yt$ of a comparator 33, whose other input terminal $Xt$ is connected to the input register 27. The output of the comparator 33 is connected to a controller 39 which in turn is connected to tape transport means or tape driving apparatus 38.

Detectors 44 and 44' are adapted to detect the address signals 17n and the still picture projection signals 16-n recorded upon the film 15 (See FIG. 2). The address signal detector 44 is connected to an up-down counter 43 which in turn is connected to an indicator 42 for indicating the content of the counter 43 upon the screen 2 and to one input terminal $Yf$ of a comparator 43 whose the other input $Xf$ is connected to the input register 27. The output terminal of the comparator 41 is connected to a controller 47 which in turn is connected to film pull-down means or film driving apparatus 46.

The comparators 33 and 41 are also connected to the command or functional keys 22, and the up-down counters 34 and 43 are connected to the clear key C and the controllers 39 and 47, respectively.

Figure 4:
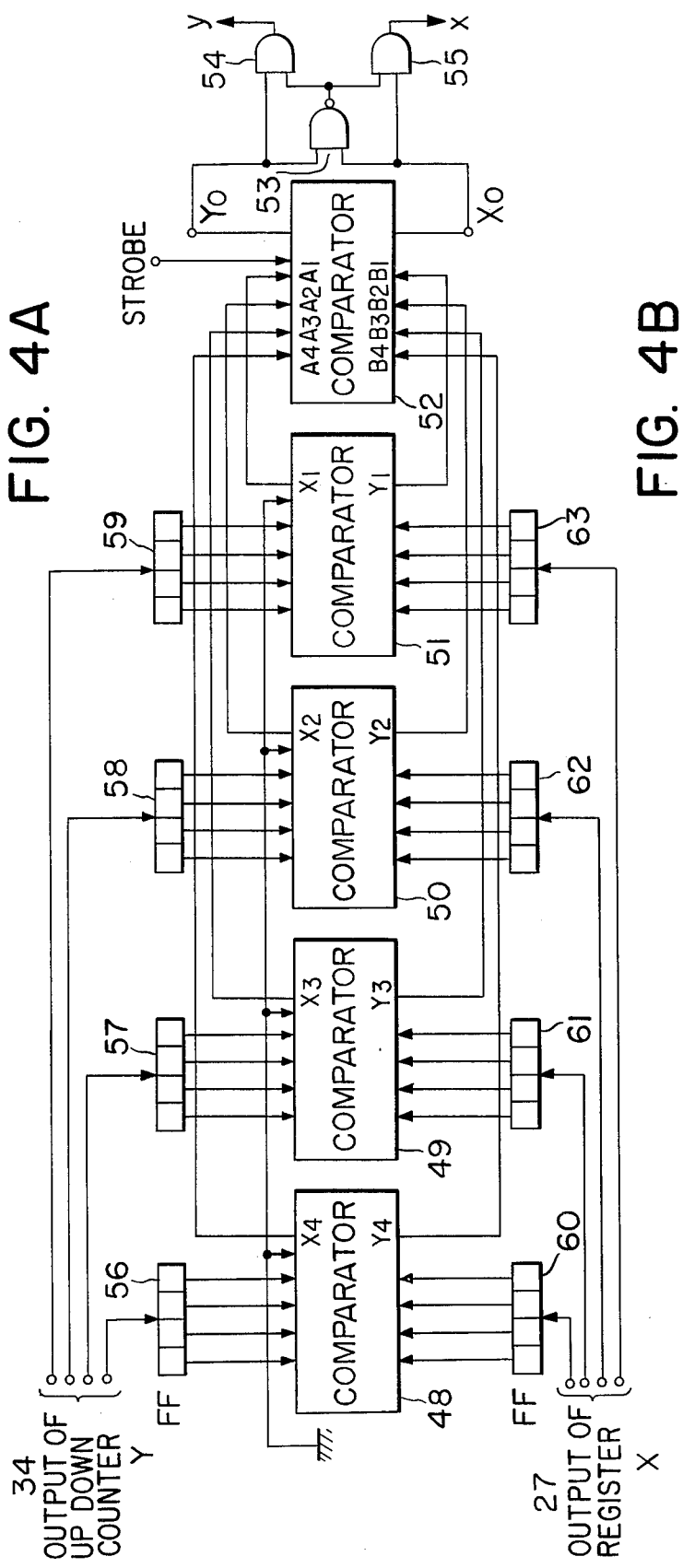
FIG. 4A is a circuit diagram of a comparator shown in FIG. 3.
FIG. 4B is a table used for the explanation of the circuit shown in FIG. 4A.

Next referring to FIGS. 4-12, the component parts of the system shown in FIG. 3 will be described in more detail. FIG. 4A shows a circuit diagram of a conventional IC digital comparator with 16 bits which may be used as the comparators 33 and 41 shown in FIG. 3. One each of inputs of comparator elements 48-52 is connected to each of memory elements such as flip-flops 56-59 of the counter 34 or 43 and the other each of inputs is connected to each of memory elements 60-63 of the input register 27. The outputs X1-X4 and Y1-Y4 of the comparator elements 48-51 are connected to the input terminals A1-A4 and B1-B4, respectively, of a comparator element 52. The strobe signal from the command signal input means 22 is applied to a remaining input terminal of the comparator element 52. The outputs Xo and Yo of the comparator element 52 are connected to the inputs of A NAND gate 53 and AND gates 54 and 55 whose outputs $x$ and $y$ are connected to the controller 39 or 47.

Figure 5:
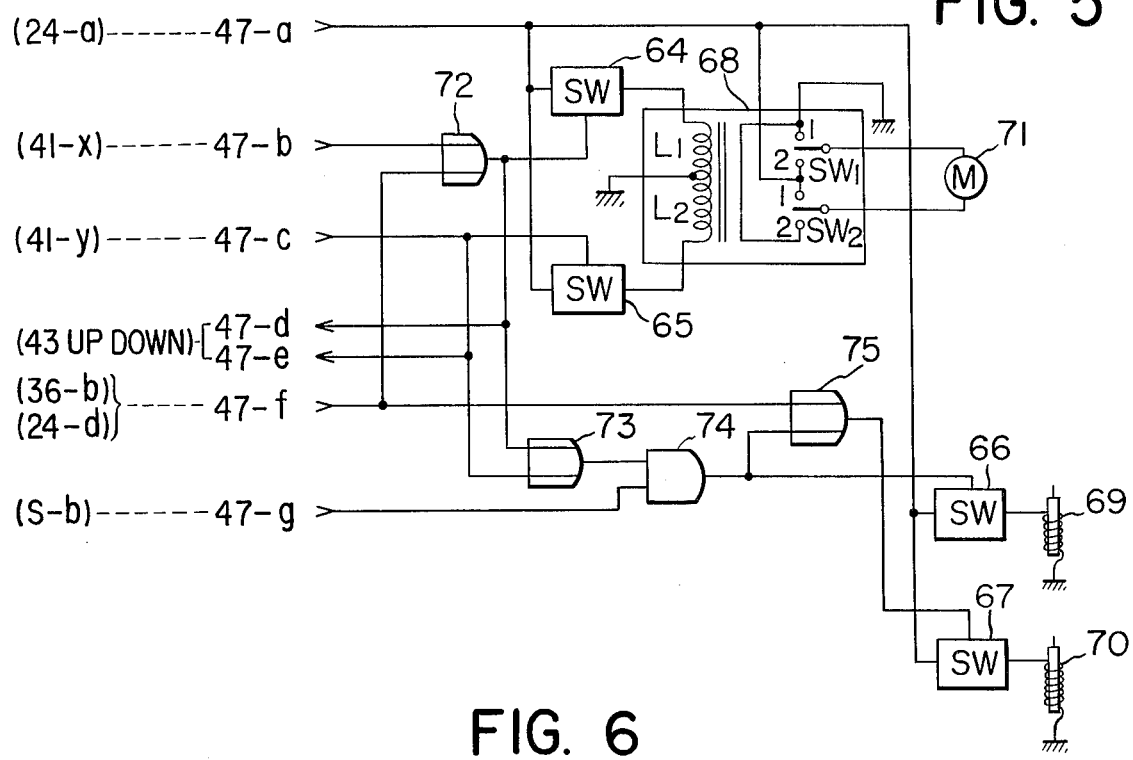
FIG. 5 is a circuit diagram of a film controller shown in FIG. 3.

FIG. 5 shows a detailed diagram of the film controller 47 shown in FIG. 3. Conventinal switching circuits 64-67 are adapted to conduct when the logic 1 signals are applied thereto, but to remain cut off when the logic 0 signals are applied thereto. A relay 68 comprises two coils L1 and L2. When both of the coils L1 and L2 are de-energized an armature remains in neutral position, but when the coil L1 is energized the armature closes the contacts 1 of switches SW1 and SW2. When the coil L2 is energized the armature closes the contacts 2. Plungers 69 and 70 are disposed within the film transport means 46 shown in FIG. 3. The plunger 69 is so actuated as to transport the film at a high speed, for example 54 frame second, for retrieval while the plunger 70 is so actuated as to transport the film at a normal frame rate when the latter is projected.

The output of terminal relay 68 is connected to a motor the of the film transport means 46. The motor 71 is of the reversible DC magnet type. Conventional OR gates 72, 73 and 75 and an AND gate 74 are interconnected as shown, and the terminals 47 frame, the 47g are connected to the terminals shown. 41x and 41y are the output terminals X and Y of the comparator 41 shown in FIG. 4. "43 up-down" indicates the up and down command input terminals of the film up-down counter 43 shown in FIG. 3. The film transport means 46 which is controlled by the film controller 47 will be described hereinafter.

Figure 6:
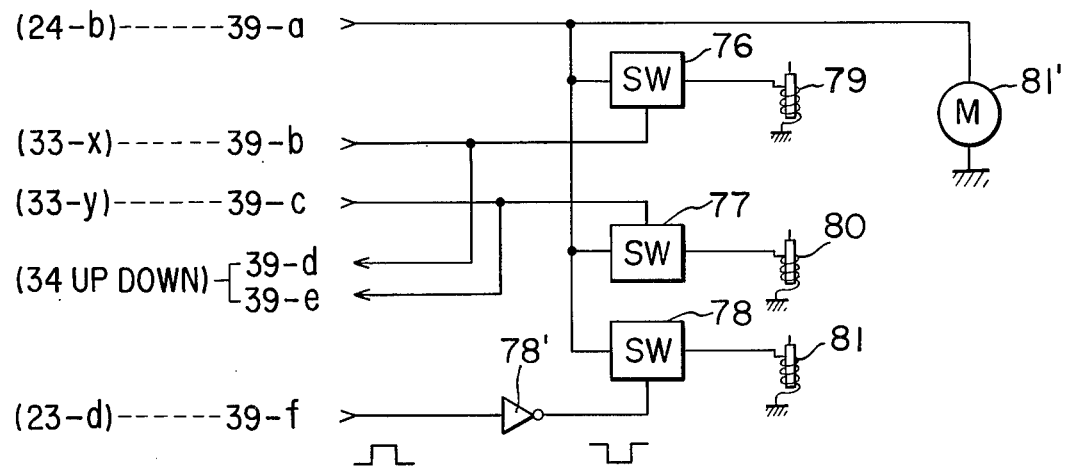
FIG. 6 is a circuit diagram of a tape controller shown in FIG. 3.

FIG. 6 is a detailed circuit diagram of the tape controller shown in FIG. 3. Switching circuits 76, 77, and 78 are adapted to conduct when the logic 1 signals are applied to the inputs thereof, but remain cut off when the logic 0 signals are applied thereto. Plungers 79, 80 and 81 are disposed within the tape transport means 38 to be described in more detail hereinafter. An inverter 78' is connected to the switching circuit 78. The terminals 39a-39f of the tape controller 39 are connected to the command signal input means 24b, the output terminals 33x and 33y of the comparator 33, the up and down command input terminals of the up-down counter 34 and the terminal 23-d, respectively.

Figure 7:
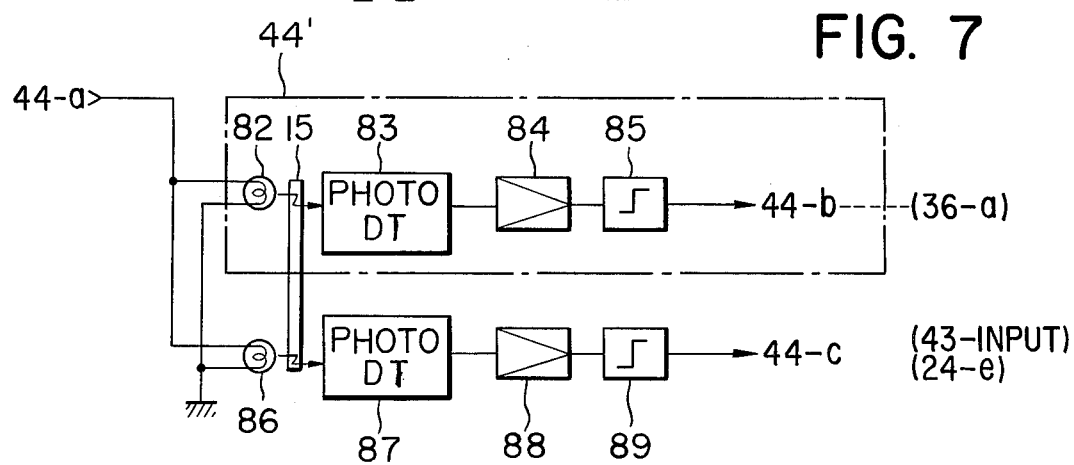
FIG. 7 is a circuit diagram of detectors shown in FIG. 3 for detecting the control signals recorded upon the film.

FIG. 7 shows the detail of the film pulse detectors 44 and 44'. Light sources 82 and 86 may be lamps, light-emitting diodes or the like. Alternatively the projection lamp of the film projector may be used as the light sources 82 and 86. Photodetectors 83 and 87 such as CdSs, silicon photodiode or the like are disposed in opposed relation with the light sources 82 and 86, respectively, in order to detect light transmitted through the film 15. The photodetectors 83 and 87 are connected to amplifiers 84 and 88, respectively, which in turn are connected to wave-shaping circuits such as Schmidt circuits 85 and 89, respectively. A terminal 44-a is connected to a power souce and output terminals 44-b and 44-c are connected to the input terminals 36a and 24e and to the input terminal 43-input of the film pulse counter 43.

Figure 8:
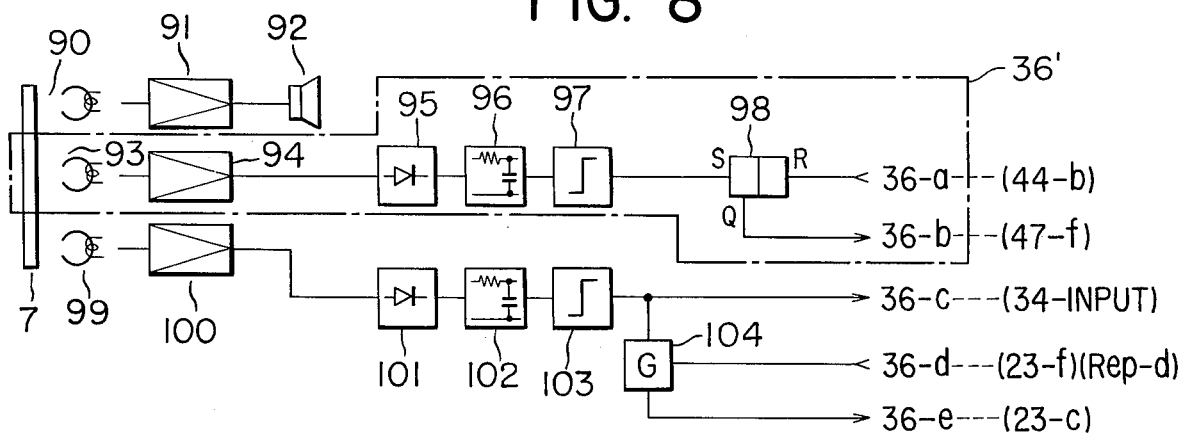
FIG. 8 is a circuit diagram of detectors shown in FIG. 3 for detecting the control signals recorded upon the magnetic tape.

FIG. 8 shows the detail of the detectors 36 and 36' shown in FIG. 3. Magnetic heads 90, 93 and 99 for detecting the signals on the tape are assembled in the same housing and connected to amplifiers 91, 94 and 100, respectively. Dialogue or narration is reproduced through a speaker 92 which is connected to the amplifier 91. The outputs of the amplifiers 94 and 100 are connected through rectifiers 95 and 101 and integrators 96 and 102 to Schmidt circuits 97 and 103, respectively. The Schmidt circuit 97 is connected to a reset-set flip-flop 98 whereas the Schmidt circuit 103 is connected to a gate circuit 104 which is conducted when the logic 1 signal is applied to the input terminal 36-*d*. The input terminals 36*a* and 36-*d* and the output terminals 36-*b*, 36-*c* and 36-*e* are connected as shown.

Figure 9:
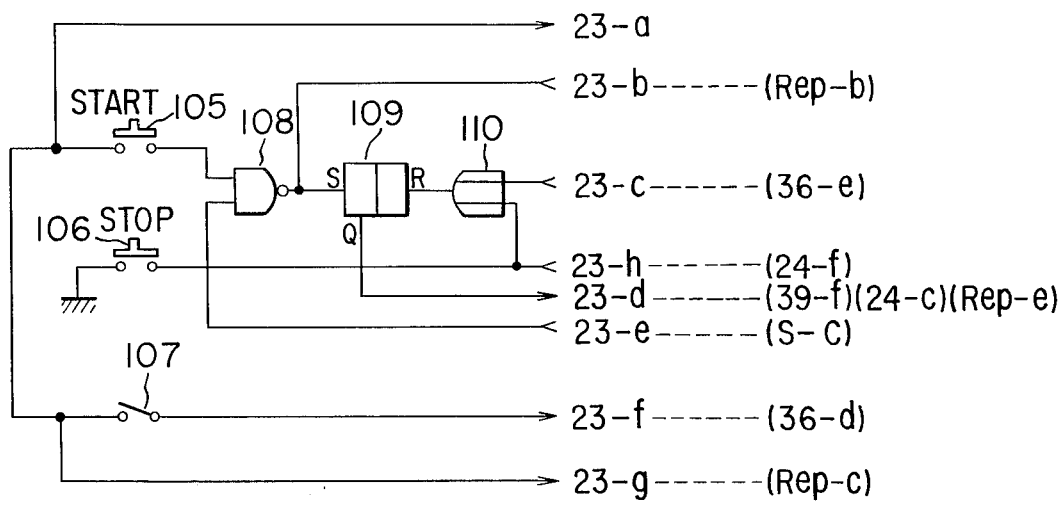
FIG. 9 is a circuit diagram of a tape start button, a tape stop button and manual-automatic switching means shown in FIG. 3.

FIG. 9 shows the detail of the start key, stop key and automatic-manual selection key. The start key 105 is connected to one input terminal of a NAND gate 108 whose output is connected to a reset-set flip-flop 109. The reset terminal R of the flip-flop 109 is connected to the output of an OR gate 110. The terminal 23-*a* is connected to the power source and other terminals 23-*b* — *g* are connected to the terminals shown.

Figure 10:
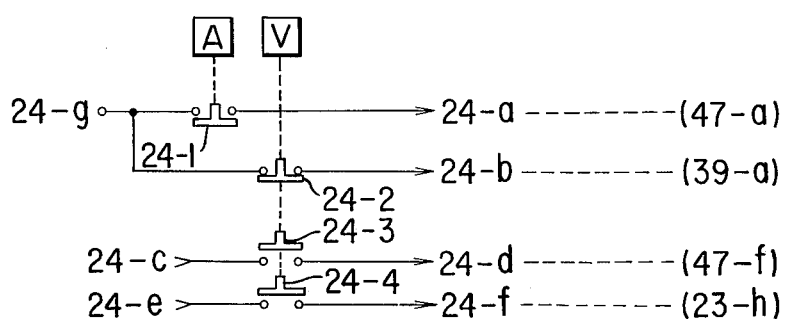
FIG. 10 is a circuit diagram of audio-video switching means shown in FIG. 3.

FIG. 10 shows the detail of the audio-video selection switch 24. Upon depression of the audio selection key A, a switch 24-1 is opened. Upon depression of the video selection key V, a switch 24-2 is opened while switches 24-3 and 24-4 are closed. The terminal 24-*g* is connected to the power source and the other terminals 24-*a* — 24-*f* are connected to the terminals shown.

Figure 11:
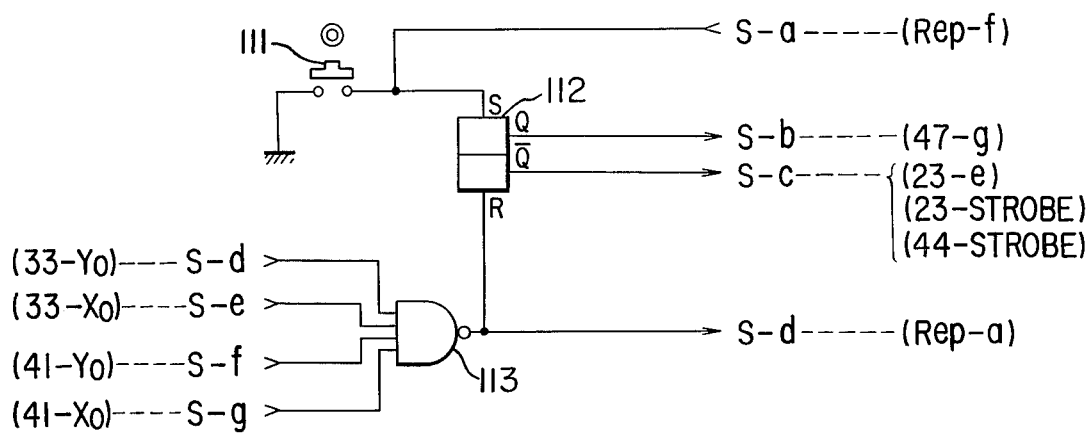
FIG. 11 is a circuit diagram of film and tape retrieval means shown in FIG. 3.

FIG. 11 shows the detail of the key marked with ⊚, one of the command input keys 22 shown in FIG. 3. This key is used to apply the command signal to the controller 31 (See FIG. 3) and to generate the signal for retrieving the film, as shown in FIG. 11. In addition to the retrieval circuit, a conventional circuit for giving the instruction to the computer (not shown) is included. Upon depression of the key ⊚, a switch 111 which is connected to the set terminal of a flip-flop 112 is closed. When the flip-flop 112 is set, the logic signals 1 and 0 appear at the output terminals Q and $\overline{Q}$, but logic signal 0 and 1 appear thereat when the flip-flop 112 is reset, respectively. The terminals S-*a* — S-*g* of the flip-flop 112 and a NAND gate 113 are connected to the terminals as shown.

Figure 12:
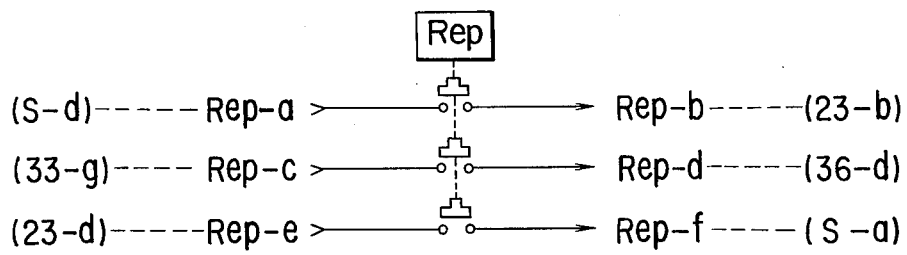
FIG. 12 is a circuit diagram of repeat means shown in FIG. 3.

FIG. 12 shows the repeat key, one of the command input keys 22. Upon depression of the repeat key Rep, switches 114, 115 and 116 of self-holding type, which are interlocked to each other, are closed. The terminals Rep-*a* — Rep-*f* are connected to the terminals shown with parenthesis, respectively.

Figure 13:
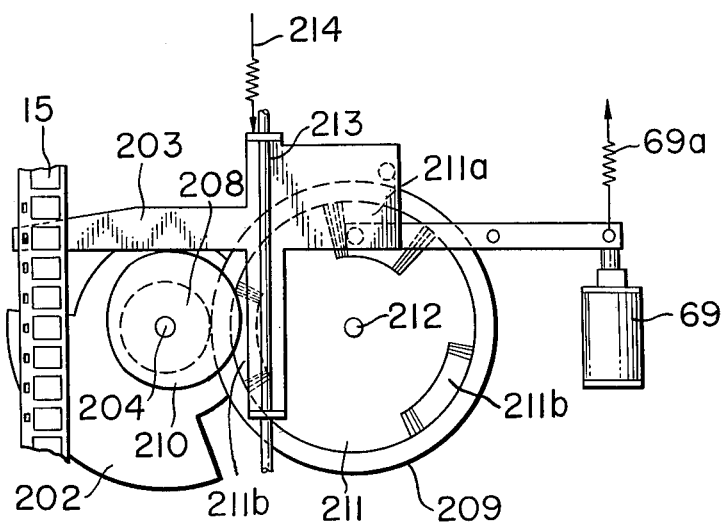
FIG. 13 is a front view of a film driving apparatus shown in FIG. 3.
Figure 14:
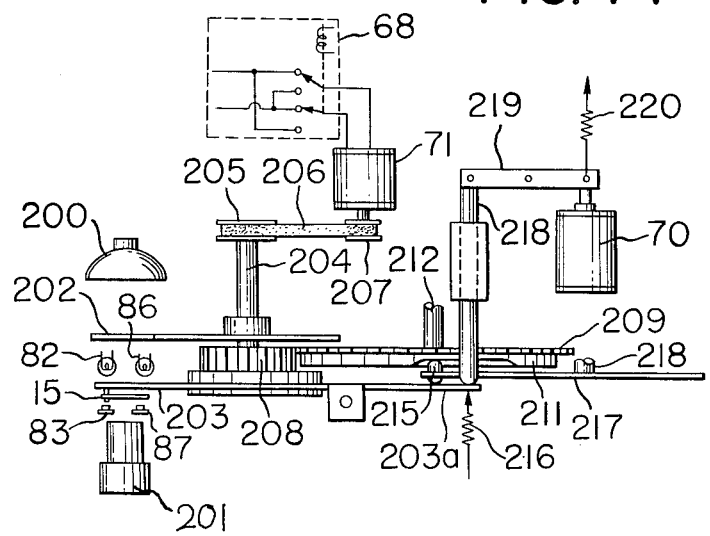
FIG. 14 is a plan view of film driving apparatus shown in FIG. 3.

Next referring to FIGS. 13 and 14 the film transport means or pull-down mechanism 46 will be described. The film 15, the relay 68, the plungers 69 and 70, the motor 71, the light sources 82 and 86 and the photodectors 83 and 87 have been already explained with reference to FIGS. 5 and 7. Light emitted from a projecton lamp 200 illuminates th film 15 so that the image may be focused through a projection lens 201 upon the screen (not shown). A shutter 202 is drivingly coupled to the motor 71 through a shutter shaft 204, a pulley 205, a belt 206 and another pulley 207. A shutter gear 208 carried by the shutter shaft 204 engages with a gear 209 having a gear ratio for example, three times that of the shutter gear 208. The gear 209 is carried by a shaft 212. A cam 210 is fixed to the shutter gear 208, and a cam 211 which is fixed to the gear 209 has two recesses 211*a* and 211*b*, the former being deeper than the latter. A pull-down claw 203 which engages with the perforations of the film 15 is adapted to vertically move along a guide rod 213. The underside of the pull-down claw 203 is normally made into contact with the cam surface of the cam 240 under the force of a spring 214, and the rear end 203*a* is made into contact with a cam follower 215 of the cam 211 under the force of a spring 216. The cam follower 215 is carried by an arm 217 which in turn is fixed to a shaft 318 for pivotal movement. A lever 219 has its one end pivoted to the plunger 70 and the other end pivoted to a contactor 218 the lower end of which is adapted to contact with the rear end portion 203*a* of the pull-down claw 203. When the plunger 70 is not energized, the cam follower 215 is removed from the pull-down claw 203 under the force of a spring 220, but when the plunger 70 is energized the cam follower 215 is made into contact with the pull-down claw 203 against the spring 220.

Figure 15:
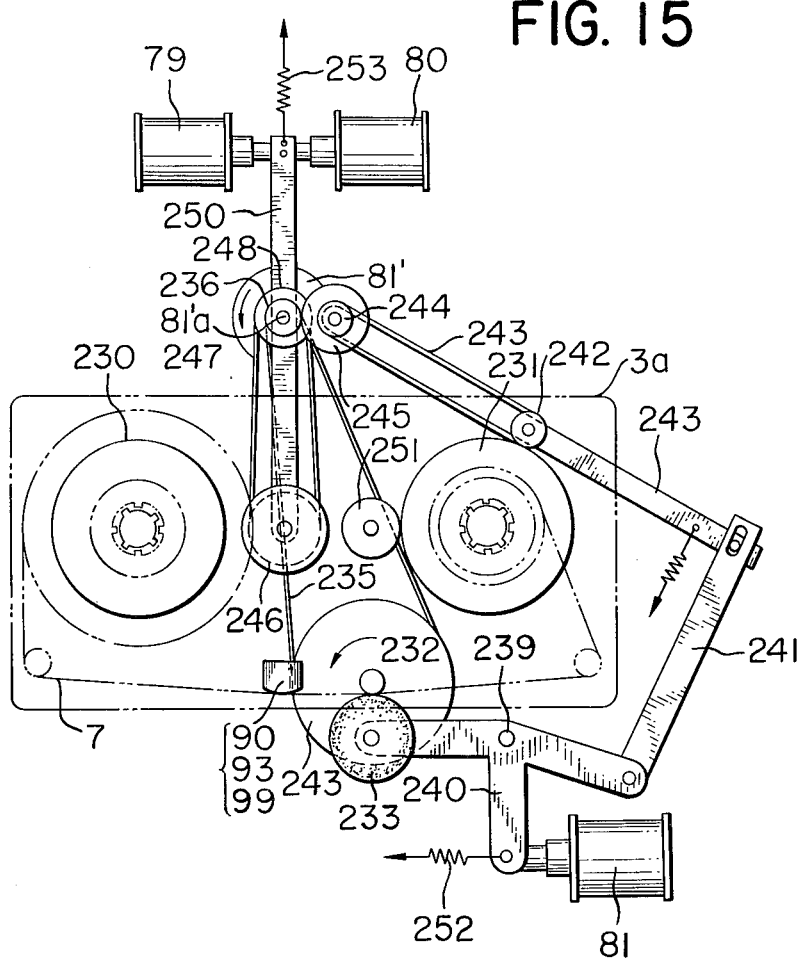
FIG. 15 is a plan view of tape driving apparatus shown in FIG. 3.

FIG. 15 shows the detail of the tape transport means or mechanism 38 shown in FIG. 3. The tape 7, the plungers 79, 80, and 81, the drive motor 81', and the magnetic heads 90, 93 and 99 have been already explained with reference to FIGS. 6 and 8. The magnetic tape 7 is wound around reels 230 and 231 in the tape cartridge 32, and is transported at a constant speed by a capstan 232 and a pinch roller 233. The capstan 232 is fixed to a flywheel 234 which is driven through a belt 235 and a pulley 236 by the driving motor 81'.

The pinch roller 233 is carried by a first arm of a three-arm lever 240 whose second arm is pivoted to the plunger 81 and whose third arm is pivoted to one end of a connecting lever 241 whose slot formed at the other end is fitted onto a pin extending from one end of a lever 243 carrying a pulley 242. The pulley 242 is drivingly coupled through a belt 243' to a pulley 244 carried coaxially by a roller 245 in engagement with a driving roller 246 of the driving motor.

A roller 246 engageable with the reel 230 is drivingly coupled through a belt 247 to a pulley 248 carried by a rotary shaft of the driving motor 81', and is carried by a lever 250 which may swing about the rotary shaft 81'*a* of the motor 81. The end remote from the roller 246 of the lever 250 is pivoted to the plungers 79 and 80. An idler 251 is in engagement with the reel 231.

The three-arm lever 240 is biased by a spring 252 so as to rotate in the clockwise direction so that the pinch roller 233 may engage with the capstan 232. The lever 243 is loaded with a spring 253 so that it may be returned to a neutral position.

Next the mode of operation will be described. First the mode for projecting the film while reproducing the dialogue or narration according to a program will be described. First the cassette tape 3*a* and the cassette film 4*a* are placed into the recesses 3 and 4, respectively, and thereafter the operator depresses the operation button 5-1 which is so connected as to depress the start button and th video key V and to switch the selection key 23-1 to the manual mode M. Therefore the start key "START" shown in FIG. 9 is depressed so that the reset-set flip-flop 109 is set, and the logic 1 signal is applied to the input terminal 23-4 of the NAND gate 108. The logic signal 1 appears at the output terminal Q of the flip-flop 109. The switches 24-1, 24-2 and 24-3 which are coupled to the key V shown in FIG. 10 are closed so that the signal 1 is transmitted from the output terminal Q through the terminal 23-*d*, the terminal 24-*c*, the switch 24-3 and the terminal 24-*d* (See FIG. 10) to the input terminal 47-*f* shown in FIG. 5. Since the terminal 47-*i* is connected to the OR gates 72 and 75, the switching gate 64 is conducted so that the relay 68 is so actuated as to drive the motor 71 (See FIGS. 5 and 14) in the clockwise direction. In response to the output signal of the OR gate 75, the switching circuit 67 is conducted so that the plunger 70 is energized. As will be described in more detail hereinafter with the reference to FIGS. 13 and 14, the pull-down claw 203 is made into engagement with the sam 211 when the plunger 70 is energized. Thus the film 15 is pulled down at a rate of 18 frames per second in the forward direction. As the film 15 is pulled down, the detector 44 (See FIG. 7) detects the address mark 17-1 so that the pulse signal appears at the terminal 44-c. This pulse signal is transmitted to the termnal 23-h (See FIG. 9) through he terminal 24-4, the switch 24-4 and the terminal 24-f (See FIG. 10) so that the reset-set flip-flop 109 is reset. As a result, the still picture is projected. Since this frame is a FOCUS frame ,the focus adjustment may be made. Next the operation button 5-2 which is equivalent to the start key is depressed so as to start the tape 7. The transport of the tape 7 and the detection of the signals recorded thereupon will be described in more detail hereinafter.

In case of the automatic mode, the tape is transported continuously so that the still-projection signal 13-1 is detected. As a result, the film is pulled down so that the next frame A (See FIG. 2) is placed into a gate of the projector. Then the still-projection signal 16-2 is detected so that the audio signals or narration associated the frame A is reproduced. In like manner the frames B and C are successively placed into the gate for projection and the narration is reproduced. As soon as the narration for the frame C has been completed, the signal 13-4 is detected so that the frame D is placed into the gate. Since the frames D-G have no still projection signal, the film is pulled down at a rate of 18 frames per second so that the moving picture is projected upon the screen while the associated narration or dialogue is reproduced simultaneously. When the frame H is pulled down, the still-projection signal 16-5 is detected so that the still picture is projected until the next signal 13-5 is detected.

In case of the manual mode, the transport of the tape 7 is interrupted everytime when the address signal 14-n is detected. As a result, every frame of the film is stopped while the associated narration is reproduced, and when the start key is depressed the next frame is pulled down and the associated narration is reproduced. Thus, according to a program the narration can be completely synchronized with the picture.

Next the mode of retrieval will be described. The steps to the projection of the focus frame are similar to those described hereinbefore. However the operator must depress the stop key before the still-projection signal 13-1 is detected after the tape has been started by depressing the operation button 5-2. In this case the indicators 26, 35 and 42 (See FIGS. 1 and 3) indicate 0. (That is, the indicators must be reset before the operation key is depressd). Assuming that the frame with an address 100 is retrieved, the operator depresses the keys 21 to enter 100, and then the button ⊚ so that 100 is entered into the input register 27 and is projected upon the screen 2 by the indicator 26. The comparators 33 and 41 compare the signal $Xt$ and $Xf$ from the input register 27 with the signals $Yt$ and $Yf$. The difference signals $Xt - Yt$ and $Xf$ and $Yf$, that is the positive + signal or the negative - signal is transmitted to the controllers 39 and 47 so that the tape and film are fast forwarded or fast rewound in response to the positive or negative signals and stopped when the difference signals become 0.

The tape pulse detector 36 and the film pulse detector 44 detect the address signals 14-n on the tape and the address signals 17-n on the film respectively. Both the tape and film are stopped when the indications by the indicators 26, 35 and 42 upon the screen 2 are all 100. Thereafter the operator depresses the start key so that the tape and film are transported according to a program in the manner described hereinbefore. That is, the narration is reproduced in synchronism with the picture.

When the operator depresses + or − key, a number keyed in by the keys 21 is added to or subtracted from the content of the input register 27 by the adder 28-2 and the accumulator 28-1, and the result is stored into the input register 27. When the operator depresses the retrieval key ⊚, the tape transport means 38 and the film transport means or pull-down mechanism 45 are driven, in the same manner as described hereinbefore, until the desired address is retrieved, that is until the difference signals of the comparators 33 and 41 become zero and then stopped. Thereafter the operator depresses the start key so that the picture is projected while the narration is reproduced according to a program in the same manner as described hereinbefore.

When the operator depresses the A or V key, only the desired address of the tape or film is retrieved.

As described hereinbefore, according to the present invention any desired address may be retrieved while the synchronization between the picture and sound may be maintained. Once the desired frame is retrieved, the picture is projected while the narration is reproduced in synchronism with the picture according to a program. Furthermore the still picture or moving pictures may be projected as needs demand, and the sound and the picture may be retrieved independently of each other. The operation is simple and similar to a keyboard of a desktop electronic calculator so that the audiovisual equipment incorporating the present invention is best adapted to give the programmed instruction in a very efficient manner.

Next the mode of operation of the comparator shown in FIG. 4A will be described with further reference to FIG. 4B. Upon depression of the numeric keys 21, a desired address number may be entered into the input register 27 through the encoder 25. Upon depression of the function key 22, the following mode of operation is made. When the operator depresses the retrieval key ⊚, it is detected whether the + key or − key has been depressed, according to a program stored in the conroller 31. The mode of operation when the + or − key has been depressed will be described in detail hereinafter. When the + or − key has not been depressed, the command is immediately applied to the comparators 33 and 41. Upon depression of the retrieval key ⊚, the strobe inputs of the comparators 33 and 41 are set to zero and the comparating operations are started. FIG. 4B shows the results of the operation of the comparator 33 or 41 when the input signal from the input register 27 is X, the input signal from the up-down counter 34 or 43 is Y, the output signals of the comparator element 52 (See FIG. 4A) are Xo and Yo, and the outputs of the comparator 33 or 41 are $x$ and $y$. When the outputs $x$ and $y$ of the comparator 33 or 41 are zero, the controller 39 or 47 is not actuated so that the tape transport means 38 or film pull-down mechanism 46 is not actuated. Thus, the audiovisual equipment is ready to start. When either of the outputs x or y is 1, for example when the input X is greater than the input Y so that the output x is 1, the tape or film is transported in the forward direction so that the input Y may be increased. The up-down counter 34 or 43 operates as up counter so that the content of the counter is increased until the outputs x and y of the comparators 33 and 41 become zero. When the outputs x and y are zero, the audiovisual equipment is ready to start.

When the output y is 1, the output Y of the counter 34 or 43 is greater than the output X of the input register 27. Then the down-counting command signal is applied to the up-down counter 34 or 43 from the controller 39 or 47, and the reverse command is applied to the tape transport means 38 or pull-down mechanism 46 so that the tape or film is reversed until the outputs x and y of the comparator 33 or 41 become zero. Then the audiovisual equipment is ready to start.

It is discussed hereinafter where the + or − key, the numeral keys 21 and the retrieval key ⊚ are depressed in turn named in case of depression of + key the content of the input register 27 is transferred into the adder 28-2 and thereafter the input register 27 is cleared. Upon depression of the keys 21, a desired address is entered into the input register 27, and thereafter upon depression of the retrieval key ⊚, the content of the input register 27 is transferred into the adder 28 as an augend or subtrahend. The sum or difference is transferred into the accumulator 28-1 and then into the input register 27. Thereafter the output signal X is applied to the comparators 33 and 41 to which is also applied simultaneously the comparison start signal. Therefore the tape and film retrieval is started.

When the minus key - is depressed, the complement of the content of the input register 27 is transferred into the adder 28-2 so that the difference is transferred into the accumulator 28-1 and then into the input register 27 as in the case of the addition. Thereafter the retrieval is started. The subtraction method using the complements is well known to those skilled in the electronic calculator.

When the operator depresses the memory key M, the content of the input register 27 is transferred into the memory 30, and is cleared.

When the operator depresses the recall key R, the content of the memory 30 is transferred into the input register 27.

Next the mode of operation of the film controller shown in FIG. 5 will be described. Power is supplied through the input terminal 47-a and the audio-visual selection key 24 (See FIG. 10). Therefore when the keys A and V are not depressed or when only the key V is depressed, the power is supplied so that the film pull-down mechanism is actuated.

To the terminals 47-b and 47-c are applied the outputs of the comparator 41. When Xf> Yf, the logic 1 is applied to the terminal 47-b, but when Xf < Yf, the logic 1 is applied to the terminal 47-c. When Xf=Yf, no signal is applied to the terminals 47-b and 47-c. When the operator depresses the retrieval key 111 (See FIG. 10), the inputs are applied to the terminals 47-b and 47-c, and the retrieval signal 1, is applied to the terminal 47-g. When X> Y, the logic 1 is applied to the terminal 47-b so that it is applied to the switching circuit 64 through the OR GATE 72. As a result the relay 68 is actuated so that the motor 71 is rotated in the forward or clockwise direction. The retrieval signal applied to the terminal 47-g is applied to the switching circuits 66 and 67 through the AND gate 74 and the OR gate 75 so that the switching circuits 66 and 67 are conducted. As a result the plungers 69 and 70 are energized so that the film 15 is pulled or transported intermittently at a rate of 54 frames per second in the forward direction as will be described in more detail with reference to FIGS. 13 and 14. The output signal is applied from the terminal 43-a to the film pulse counter 34 as the addition signal so that the content of the counter 34 is increased. When Xf=Yf, the output of the comparator 41 disappears, that is the input applied to the terminal 47-b becomes zero. As a consequence the motor 71 is stopped and the plungers 69 and 70 are de-energized.

When the signal is applied to the terminal 47-c, the switching circuit 65 is conducted so that the relay 68 is actuated to reverse the motor 71 and the plungers 69 and 70 are energized. The subtraction signal is transmitted to the film pulse counter 43 from the terminal 47-e so that the content of the counter 43 is subtracted by the number of frames reversed. When Xf=Yf, the output of the comparator 41 becomes zero so that the transport of the film 15 in the reverse direction is stopped.

In response to projection signal 1 applied to the terminal 47-f, the motor 71 is rotated in the forward direction and the plunger 70 is energized. As a result the film 15 is transported at a rate of 18 frames or one frame per second.

Next referring back to FIG. 6, the mode of operation of the tape controller will be described. The power is supplied through the terminal 39-a and the audio-video selection key 24 from the power source. More particularly when neither of the keys A and V are depressed or when only the key A is depressed, the power is supplied to actuate the tape transport means 38.

The logic 1 is applied to the terminal 39-b when Xt>Yt so that the plunger 79 is energized. Since the plunger 81 is also energized, the fast forward of the tape is effected. On the other hand when the logic 1 is applied to the terminal 39-c, the plunger 80 is energized. As a result the fast rewind of the tape is effected. When Xt=Yt, neither of the plungers 79 and 80 are energized. The addition and subtraction signals are applied to the tape pulse counter 34 from the terminals 39-d and 39-e, respectively. To the terminal 39-f is applied the output signal of the start-stop input means 23. When the logic 1 is applied, it is transmitted to the switching circuit 78 through the inverter 78' so that the switching circuit 78 is opened to de-energize the plunger 81. As a result the tape is transported in the forward direction at a normal speed.

Next referring to FIG. 7 the mode of operation of the detectors 44 and 44' will be described. The signals recorded upon the film 15 are detected by the photodetectors 83 and 87. The output signals of the photodetectors 83 and 87 are amplified, shaped and derived as the pulses.

Referring to FIG. 8, the mode of operation of the tape pulse detectors 36 and 36' will be described. The audio signals recorded on the tape 7 are detected by the magnetic head 90, amplified by the amplifier 91 and reproduced through the speaker 92.

The still-picture-projection release signals or film feed control signals upon the tape 7 are detected by the magnetic head 93, amplified by the amplifier 95, integrated by the integrator 96 and shaped by the Schmidt circuit 97 so that the pulse signal is applied to the set input of the flip-flop 98. As a result the flip-flop 98 is set so that the logic 1 appears at the output terminal Q and is transmitted from the output terminal 36b to the input terminal 47-f shown in FIG. 5. As a result the film 15 is transported. The output of the film pulse detector 44 is applied from the output terminal 44-b to the input terminal 36-a so that the flip-flop 98 is reset. In like manner in response to the signals detected, the flip-flop 98 are repeatedly set and reset.

The address signals recorded upon the tape 7 are detected by the magnetic head 99, amplified by the amplifier 100, rectified by the rectifier 101, integrated by the integrator 102 and shaped by the Schmidt circuit 103 so that the pulse signal is transmitted from the output terminal 36-c to the tape pulse counter 34. The gate circuit 104 is opened in response to the signal applied from the terminal 23-f of the manual-automatic selection switch 23 or in response to the signal from the repeat circuit (See FIG. 12). When the key 23 is set to automatic mode, the gate 104 is on, but when the key is set to the manual mode the gate is off. The retrieval signal is transmitted to the terminal 36-e and then to the input terminal 23-c of the start-stop input circuit 23. When the repeat key has been depressed, the gate 104 is opened so that the retrieval signal is also transmitted.

Next the mode of operation of the circuit shown in FIG. 9 will be described. When the start switch 105 is closed, the signal is transmitted through the NAND gate 108 to the flip-flop 109 so that the latter is set. When the stop switch 106 is closed, the signal is transmitted through the OR gate 110 to the flip-flop 109 so that the latter is reset. The flip-flop 109 is also set in response to the signal applied to the input terminal 23-b when the repeat key (See FIG. 12) is depressed or in response to the signal representative of the completion of retrieval. As a result the signal for starting the tape is derived. When the manual-automatic selection switch 23-1 is set to the manual mode, the flip-flop 109 is reset in response to the signal applied to the input terminal 23-c when the next retrieval signal is detected. As a result the signal for stopping the tape is derived. When the switch 23-1 is set to the automatic mode, no signal is applied to the input terminal 23-c.

The output signal of the flip-flop 109 is transmitted from the output terminal Q and the output terminal 23-d to the tape transport means 38 or film transport means or pull-down mechanism 46 depending upon whether the key A or V is depressed, thereby actuating means 38 or 46.

To the input terminal 23-e is applied the logic 1 when the retrieval is accomplished, but the logic 0 is applied when the retrievel operation is carried on so that even when the start key is depressed the film or tape may be not started.

When the manual-automatic selection means 23-1, that is when the switch 107 is closed, the logic 1 is derived from the terminal 23f, but the logic 0 is derived when the switch 107 is opened.

The output signal is derived from the terminal 23-g when the repeat button Rep is depressed and is transmitted to the terminal Rep-C (See FIG. 12).

Next the mode of operation of the circuit shown in FIG. 10 will be described. When the key A is depressed the switch 24-1 is opened while the switch 24-2 is closed so that the audio information circuit described hereinbefore is established. When the key V is depressed, the switch 24-2 is opened while the switches 24-3 and 24-4 are closed so that the video information circuit described hereinbefore is established.

Next the mode of operation of the circuit shown in FIG. 11 will be described. Upon depression of the retrieval key 111, the flip-flop 112 is set, but when the outputs of the comparators 33 and 41 are zero, that is when the desired picture and sound have been retrieved, the flip-flop 112 is reset.

To the input terminal S-a is applied the repeat signal for repeating the steps of retrieval, start and stops.

The retrieval start signal is derived from the output terminal Q of the flip-flop 112 and transmitted from the terminal S-b to the input terminal 47-g.

The output signal derived from the output terminal $\overline{Q}$ of the flip-flop 112 is transmitted from the output terminal S-c to the comparators 33 and 41 for causing them to start the comparison operation and to the start key as the start ready signal.

Next the mode of operation of the circuit shown in FIG. 12 will be described. Upon depression of the repeat key Rep, the switches 114, 115 and 116 are closed to establish a desired circuit.

Next referring to FIGS. 13 and 14 the film pull-down mechanism or film transport means will be described briefly. In case of the fast forward, the plungers 69 and 70 are energized and the relay 68 is so actuated as to drive the motor 71 in the forward direction. The cam follower 215 is so held by the plunger 69 against the spring 69a as to be moved away from the cams 211a and 211b. As a result the pull-down pawl 203 is so reciprocated as to pull the film at a rate of 54 frames per second.

When the relay 68 is so actuated as to cause the motor 71 to rotate in the reverse direction the film is transported in the reverse direction at the same rate.

When the plunger 70 is energized while the plunger 69 is de-energized. The cam follower 215 is lifted a little by the cam 211a so that the film is pulled at a slower rate, for example one third of the fast forward of 54 frames per second, that is at a rate of 18 frames per second. In case of the still-picture projection the pull-down pawl 203 is not actuated at all as the plunger 70 is de-energized.

Next referring to FIG. 15 the mode of operation of the tape transport means will be described briefly. When the plunger 81 is energized while the plungers 79 and 80 are de-energized, the tape 7 is released from both the pinch roller 233 and the capstan 232 so that the transport of the tape 7 is interrupted.

In case of the fast forward, the plungers 79 and 91 are energized while the plunger 80 is de-energized so that the lever 250 is swung counter clockwise in FIG. 15. As a consequence the roller 246 is made into engagement with the idler 251 so that the driving power is transmitted to the take-up reel 231. Thus the fast forward is started.

In case of the fast rewind, the plungers 81 and 80 are energized while the plunger 79 is de-energized so that the lever 250 is swung clockwise in FIG. 15 to transmit the driving power to the supply reel 230. Therefore the supply reel 230 is rotated in the reverse direction at a high speed.

In case of the reproduction mode, all of the plungers are de-energized so that the pinch roller 233 presses the tape 7 against the capstan 232 to transport the tape 7 at a predetermined speed.

We claim:

1. A system for reproducing video information and audio information in synchronism with each other, said system comprising:
    a. A roll film on which the video information, a plurality of still projection signal marks and a plurality of film address marks are optically recorded, said video information being recorded on the film in frame units, and each of said still projection signal marks being provided for each frame of the film for which a still picture projection should be done;
    b. a magnetic tape on which the audio information, a plurality of still projection release signal marks and a plurality of tape address marks are magnetically recorded, said audio information being associated with the video information recorded on said film in frame units and each of still projection release signal marks being provided at such a location on the tape that the location has a corresponding relationship to the frame of the film for which the still picture projection should be done;
    c. video information reproduction means for reproducing the video information on said roll film;
    d. audio information reproduction means for reproducing the audio information on said magnetic tape, said audio information reproduction means including converting means for detecting the tape address marks recorded on the tape and converting same into a corresponding tape stop signal;
    e. means for optically detecting the still projection signal marks and the film address marks on the film and for developing corresponding film stop signals;
    f. means for detecting the still projection release signal mark on the tape and developing a film start signal;
    g. means for transporting the film through a video information reproducing station of said video information reproducing means;
    h. means for transporting the tape through an audio information reproducing station of said audio information reproducing means;
    i. control means for controlling the film stop and start operation of said film transporting means in accordance with the film stop signal and the film start signal, said control means having a first input terminal connected to said still projection signal mark detecting means, a second input terminal connected to said still projection release signal mark detecting means, and an output terminal connected to said film transporting means, wherein upon receipt of the film stop signal at the first input terminal, said control means causes said film transporting means to stop the film and upon receipt of the film start signal at the second input terminal, said control means causes said film transporting means to start the film; and
    j. retrieving means coupled to each of the two said transporting means, to said converting means and to said optical detecting means for retrieving selected corresponding portions of said tape and said film in response to entered address instructions.

2. A system according to claim 1 wherein said still projection signal marks are recorded in a series on a still projection signal track which is in parallel relationship with a video information track extending in a longitudinal direction on said roll film.

3. A system according to claim 1 wherein said still projection release signal marks are recorded in a series on a release signal track which is in parallel relationship with an audio information track extending in a longitudinal direction on said magnetic tape.

4. A system according to claim 1 wherein said film transporting means comprises a film transporting mechanism for actually transporting the film, and a driving motor mechanically linked with said film transporting mechanism; and said control means comprises a clutch mechanism for selectively disengaging the mechanical link of said film transporting mechanism with said driving motor, and clutch control means for enabling said clutch mechanism to operate upon recepit of the film stop signal from said still projection signal mark detecting means so that the mechanical link is disengaged, and so that said clutch mechanism is prevented from operating upon receipt of the film start signal from said still projection release signal mark detecting means.

5. A system according to claim 1 wherein said video information on the film comprises a group of video information for motion picture projection and a group of video information for still picture projection, and each of these groups is arranged in random order.

6. A system for reproducing video information and audio information in synchronism with each other, said system comprising:
    a. a roll film on which the video information, a plurality of still projection signal marks and a plurality of film address marks are optically recorded, said video information comprising a first group of video information recorded on the film in frame units for a still picture projection and a second group of video information recorded on the film over a plurality of frames for a motion picture projection, each of these groups being arranged in random order, and each of said still projection signal marks being provided for each frame for which the still picture projection should be done;
    b. a magnetic tape on which the audio information, a plurality of still projection release signal marks and a plurality of tape address marks are magnetically recorded, said audio information being associated with the video information recorded on said film in frame units, and each of the still projection release signal marks being provided at such a location on the tape that the location has a corresponding relationship to the frame of the film for which the still picture projection should be done;
    c. video information reproduction means for reproducing the video information on said roll film;
    d. audio information reproduction means for reproducing the audio information on said magnetic tape, said audio information reproduction means comprising converting means for detecting the audio information, the release signal marks, and the tape address marks recorded on the tape and converting the detected audio information, release signal marks, and tape address marks into electric signal as an audio signal, a film start signal, and a tape stop signal, respectively, and means connected to said converting means for reproducing the converted electric signal corresponding to the audio information as sound;
    e. means for optically detecting the still projection signal marks and the film address marks on the film and for developing corresponding electric signals as film stop signals;

f. means for intermittently transporting the film through a video information reproducing station of said video information reproducing means;

g. means for continuously transporting the tape through an audio information reproducing station of said audio information reproducing means;

h. control means for controlling the film stop and start operation of said film transporting means in accordance with the film stop signal and the film start signal, said control means having a first input terminal connected to said still projection signal mark detecting means, a second input terminal connected to said converting means, and an output terminal connected to said film transporting means, wherein upon receipt of the film stop signal at the first input terminal, said control means causes said film transporting means to stop the film, and upon receipt of the film start signal at the second input terminal, said control means causes said film transporting means to start the film; and i. retrieving means coupled to each of the two said transporting means, to said converting means and to said optical detecting means for retrieving selected corresponding portions of said tape and said film in response to entered address instructions.

7. A system according to claim 6 wherein said still projection signal marks are recorded in a series on a still projection signal track which is in a parallel relationship with a video information track extending in a longitudinal direction on said roll film.

8. A system according to claim 6 wherein said still projection release signal marks are recorded in a series on a release signal track which is in a parallel relationship to an audio information track extending in a longitudinal direction on said magnetic tape.

9. A system according to claim 6 wherein said converting means comprises first converting means for detecting the audio information on the audio information track and for converting the detected audio information into the electric signals, and second converting means for detecting the still projection release signal marks on the release signal track and for converting the detected release signal marks into the electric signals, wherein the output terminal of said first converting means is connected to the input terminal of said audio information reproduction means, and the output terminal of said second converting means is connected to the second input terminal of said control means, respectively.

10. A system for reproducing vido information and audio information in synchronism with each other, said system comprising:

a. a roll film on which the video information and a plurality of still projection signal marks and film address marks are optically recorded, said video information comprising a first group of video information recorded on the film in frame units for an auto-still picture projection, a second group of video information recorded on the film over a plurality of frames for a motion picture projection, and a third group of video information recorded on the film in frame units for a manual-still picture projection, each of these groups being arranged in random order, each of said still projection signal marks being provided for each frame for which the auto-still picture projection should be performed, and said film address marks being provided for a desired frame for which the manual still picture projection should be performed;

b. a magnetic tape on which the audio information and a plurality of still projection release signal marks and tape address marks are magnetically recorded, said audio information being associated with the video information recorded on said film in frame units, and each of said still projection release signal marks being provided at such a location on the tape that the location has a corresponding relationship to the frame of the film for which the auto-still picture projection should be done, and said tape address marks being provided at such a location on the tape that the location has a corresponding relationship to the frame of the film for which the manual-still picture projection should be done;

c. video information reproduction means for reproducing the video information on said roll film;

d. audio information reproduction means for reproducing the audio information on said magnetic tape, said audio information reproduction means comprising converting means for detecting the audio information, the release signal marks and tape address marks recorded on the tape and converting the detected audio information, release signal marks and tape address marks into electric signals as an audio signal, a film start signal and a tape stop signal, respectively, and means connected to said converting means for reproducing the converted electric signal corresponding to the audio information as sound;

e. means for optically detecting the still projection signal marks and the film address marks on the film and developing corresponding electric signals as film stop signals;

f. means for intermittently transporting the film through a video information reproducing station of said video information reproducing means;

g. means for continuously transporting the tape through an audio information reproducing station of said audio information reproducing means;

h. manual operation means externally operable for entering an operation signal to actuate said film transporting means and said tape transporting means;

i. first control means for controlling the film stop and start operation of said film transporting means in accordance with the film stop signal, the film start signal and the operation signal, said first control means having a first input terminal connected to said still projection signal mark and film address mark detecting means, a second input terminal connected to said converting means, a third input means connected to said manual operation means, and an output terminal connected to said film transporting means; and j. second control means for controlling the tape stop and start operation of said tape transporting means in accordance with the tape stop signal and the operation signal, said second control means having a first input terminal connected to said converting means, a second input terminal connected to said manual operation means, and an output terminal connected to said tape transporting means;

wherein when said first control means receives the film stop signal due to the film address mark at its first input terminal, and when said second control means receives the tape stop signal due to the tape address mark at its first input terminal, said both control means stop said film transporting means and said tape transporting in their operation means, and when said first and second control means receive the operation signal from said manual operation means at their third input terminal and second input terminal, respectively, said both control means cause said film transporting means and said tape transporting means to start the film and the tape, respectively, in synchronism with each other, wherein manual-still projection is performed;

and when said first control means receives the film stop signal due to the still projection signal mark at its first input terminal, said first control means causes said film transporting means to stop the film and when said first control means receives the film start signal due to the still projection release signal mark at its second input terminal, said first control means causes said film transporting means to start the film, these performances being repeated until said second control means receives the tape stop signal due to the tape address mark at its first input terminal, so that said second control means causes said tape transporting means to stop the tape transporting, whereby auto-still picture projection is performed;

and if said first and second control means do not receive any signals at their input terminals during the operation, motion picture projection is performed.

11. A system according to claim 10 wherein said still projection release signal marks are recorded in a series on a release signal track which is in a parallel relationship to an audio information track extended in a longitudinal direction on said magnetic tape, and said tape address marks are recorded on an address track which is in a parallel relationship to the audio information track and the release signal track.

12. A system according to claim 10 wherein said converting means comprises first converting means for detecting the audio information on the audio information track and for converting the detected audio information into the electric signals, second converting means for detecting the still projection release signal marks on the release signal track and for converting the detected release signal marks into the electric signals, and third converting means for detecting the tape address on the address track and for converting the detected address marks into the electric signals, wherein the output terminal of said first converting means is connected to the input terminal of said audio information reproduction means, the output terminal of said second converting means is connected to the second input terminal of said first control means, and the output terminal of said third converting means is connected to the first input terminal of said second control means.

13. A system according to claim 10 wherein said film transporting means comprises a film transporting mechanism for actually transporting the film, and a driving motor mechanically linked with said film transporting mechanism; and said second control means comprises a clutch mechanism for selectively disengaging the mechanical link of said film transporting mechanism with said driving motor, and clutch control means for enabling said clutch mechanism to operate upon receipt of the film stop signal from said second converting means so that the mechanical link is disengaged, and for preventing said clutch mechanism from operating upon receipt of the operation signal from said manual operation means.

14. A system for reproducing video information and audio information in synchronism with each other, said system comprising:

a. a roll film on which the video information and a plurality of still projection signal marks and film address marks are optically recorded, said video information being recorded on the film in frame units, and each of said still projection signal marks being provided for each frame of the film for which a still picture projection should be done, and each of said film address marks being provided for a desired frame for which a retrieval operation is required;

b. a magnetic tape on which the audio information and a plurality of still projection release signal marks and tape address marks are magnetically recorded, said audio information being associated with the video information recorded on said film in frame units, and each of still projection release signal marks being provided at such a location on the tape that the location has a corresponding relationship to the frame of the film for which the still picture projection should be done, and each of said tape address marks being provided at such a location on the tape that the location has a corresponding relationship to the desired frame of the film for which the retrieval operation is required;

c. video information reproduction means for reproducing the video information on said roll film;

d. audio information reproduction means for reproducing the audio information on said magnetic tape;

e. means for optically detecting the still projection signal marks on the film and developing a film stop signal;

f. means for detecting the still projection release signal marks on the tape and developing a film start signal;

g. means for transporting the film through a video information reproducing station of said video information reproducing means;

h. means for transporting the tape through an audio information reproducing station of said audio information reproducing means; and i. retrieving means comprising first address mark detecting means for optically detecting the film address marks on the film and for developing corresponding film address signals, second address mark detecting means for detecting magnetically the tape address marks on the tape and for developing corresponding tape address signals, instruction signal input means externally operable for entering an instruction signal to indicate the desired address of the film and tape, holding means for holding the instruction signal from said instruction signal input means, first comparing means for comparing the output from said instruction signal input means with the output from said first address mark detecting means, said first comparing means having a first input terminal connected to the output terminal of said first address mark detecting means, and a second input terminal connected to the output terminal of said holding means, and second comparing means for comparing the output from said instruction signal input means with the output from said second address mark detecting means, said second comparing means having a first input terminal connected to the output of said second address mark detecting means, and a second input terminal connected to the output terminal of said holding means;

j. information reproducing instruction means for instructing the reproduction of audio information and video information;

k. first control means for controlling the start and stop operation of said film transporting means, said first control means having a first input terminal connected to the output terminal of said still projection signal mark detecting means, a second input terminal connected to the output terminal of said still projection release signal mark detecting means, a third input terminal connected to the output terminal of said first comparing means, a fourth input terminal connected to the output terminal of said information reproducing instruction means, and an output terminal connected to the input terminal of said film transporting means;

l. second control means for controlling the start and stop operation of said tape transporting means, said second control means having a first input terminal connected to the output terminal of said second comparing means, a second input terminal connected to the output terminal of said information reproducing instruction means, and an output terminal connected to input terminal of said tape transporting means;

wherein, in retrieval operation, said first control means is effective to retain the operation of said film transporting means until said first comparing means generates a predetermined output regardless of the film start signal and the film stop signal, and said second control means operates to retain the operation of said tape transporting means until said second comparing means generates a predetermined output, and when both video information and audio information located at the desired address are carried to the reproducing stations, said film transporting means and said tape transporting means are stopped in their operations so that the retrieval operation is terminated, and then the operation of said information reproducing instruction means interrupts the effective coupling of said first and second control means with said first and second comparing means, respectively, so that said film transporting means and said tape transporting means are set in such a condition that they are operative, and thus said first control means causes said film transporting means to stop the film upon receipt of the film stop signal from said still projection signal mark detecting means, and to start the film upon receipt of the film start signal from said still projection release signal mark detecting means.

15. A system according to claim 14 wherein said first control means includes means for causing said film transporting means to selectively transport the film in the forward and backward directions in accordance with the output from said first comparing means, and said second control means includes means for causing said tape transporting means to selectively transport the tape in the forward and backward directions in accordance with the output from said second comparing means.

16. A system according to claim 14 wherein said retrieval means includes means for providing a digital display of the input signal from said instruction signal input means and the detected address signals from said first and second address mark detecting means.

17. A system according to claim 14 wherein said film address marks are recorded in a series on a film address track which is in a parallel relationship to the video information track on said roll film, and said tape address marks are recorded in a series on a tape address track which is in a parallel relationship to the audio information track on said magnetic tape.

18. A system according to claim 14 wherein said holding means comprises an encoder and an input register.

19. A system according to claim 14 wherein said tape transporting means comprises a tape transporting mechanism for actually transporting the tape, and a driving motor mechanically linked with said tape transporting mechanism, and said second control means comprises a clutch mechanism for selectively disengaging the mechanical link of said tape transporting mechanism with said driving motor, clutch control means for enabling said clutch mechanism to operate, and a first control circuit for controlling said clutch mechanism; said film transporting means comprises a film transporting mechanism for actually transporting the film, and a driving motor mechanically linked with said film transporting mechanism; and said first control means comprises a clutch mechanism for selectively disengaging the mechanical link of said film transporting mechanism with said driving motor, clutch control means for enabling said clutch mechanism to operate, and a second control circuit for controlling said clutch mechanism.

20. A system for reproducing video information and audio information in synchronism with each other, said system comprising:

a. a roll film on which the video information and a plurality of still projection signal marks and film address marks are optically recorded, said video information comprising a first group of video information recorded on the film in frame units for an auto-still picture projection, a second group of video information recorded on the film over a plurality of frames for a motion picture projection, and a third group of video information recorded on the film in frame units for a manual-still picture projection, each of these groups being arranged in random order, each of said still projection signal marks being provided for each frame for which the auto-still picture projection should be performed, and said film address marks being provided for a desired frame for which the manual still picture projection should be performed;

b. a magnetic tape on which the audio information and a plurality of still projection release signal marks and tape address marks are magnetically recorded, said audio information being associated with the video information recorded on said film in frame units, and each of the still projection release signal marks being provided at such a location on the tape that the location has a corresponding relationship to the frame of the film for which the auto-still picture projection should be done, and said tape address marks being provided at such a location on the tape that the location has a corresponding relationship to the frame of the film for which the manual-still picture projection should be done;

c. video information reproduction means for reproducing the video information on said roll film;

d. audio information reproduction means for reproducing the audio information on said magnetic tape;

e. means for optically detecting the still projection signal marks on the film and developing corresponding film stop signals;

f. means for detecting the still projection release signal mark on the tape and developing corresponding film start signals;

g. means for transporting the film through a video information reproducing station of said video information reproducing means;

h. means for transporting the tape through an audio information reproducing station of said audio information reproducing means;

i. retrieving means comprising first address mark detecting means for optically detecting the film address marks on the film and for developing corresponding film address signals, second address mark detecting means for detecting magnetically the tape address marks on the tape and for developing corresponding tape address signals, instruction signal input means externally operable for entering an instruction signal to indicate the desired address of the film and tape, holding means for holding the instruction signal from said instruction signal input means, first comparing means for comparing the output from said instruction signal input means with the output from said first address mark detecting means, said first comparing means having a first input terminal connected to the output terminal of said first address mark detecting means, a second input terminal connected to the output terminal of said holding means, and second comparing means for comparing the output from said instruction signal input means with the output from said second address mark detecting means, said second comparing means having a first input terminal connected to the output of said second address mark detecting means, and a second input terminal connected to the output terminal of said holding means, and retrieval instruction means externally operable for instructing the retrieval, said retrieval instruction means permitting the entry of the outputs of said holding means and said first address mark detecting means into said first comparing means, and the entry of the outputs of said holding means and said second address mark detecting means into said second comparing means, respectively;

j. information reproducing instruction means externally operable for instructing the reproduction of the audio information and the video information;

k. first control means for controlling the start and stop operation of said film transporting means, said first control means having a first input terminal connected to the output terminal of said still projection signal mark detecting means, a second input terminal connected to the output terminal of said still projection release signal mark detecting means, a third input terminal connected to the output terminal of said first comparing means, a fourth input terminal connected to the output terminal of said information reproducing instruction means, and an output terminal connected to the input terminal of said film transporting means; and l. second control means for controlling the start and stop operation of said tape transporting means, said second control means having a first input terminal connected to the output terminal of said second comparing means, a second input terminal connected to the output terminal of said information reproducing instruction means, and an output terminal connected to the input terminal of said tape transporting means;

wherein when said retrieval instruction means operates, said first control means is effective to retain the operation of said film transporting means until said first comparing means generates a predetermined output regardless the film start signal and the film stop signal, and said second control means is effective to retain the operation of said tape transporting means until said second comparing means generates a predetermined output, and when both video information and audio information located at the desired address are carried to the reproducing stations, said film transporting means and said tape transporting means are stopped in their operations so that the retrieval operation is terminated;

and when said information instruction means operates, said first control means actuates said film transporting means, and said second control means actuates said tape transporting means, respectively, wherein 1. when said first control means receives the film stop signal due to the film address mark at its first input terminal, and when said second control means receives the tape stop signal due to the tape address mark at its first input terminal, said both control means stop said film transporting means and said tape transporting means in their operation, and when said first and second control means receive the operation signal from said manual operation means at their third input terminal and second input terminal, respectively, said both control means causes said film transporting means and said tape transporting means to start the film and the tape, respectively, in synchronism with each other, whereby the manual-still picture projection is performed, 2. when said first control means receives the film stop signal due to the still projection signal mark at its first input terminal, said first control means causes said film transporting means to stop the film, and when said first control means receives the film start signal due to the still projection release signal mark at its second input terminal, said first control means causes said film transporting means to start the film, these performances being repeated until said second control means receives the tape stop signal due to the tape address mark at its first input terminal, so that said second control means causes said tape transporting means to stop the tape transporting, whereby the auto-still picture projection is performed; and 3. if said first and second control means do not receive any signals at their input terminals during the operation, the motion picture projection is performed.

21. A system according to claim 20 wherein said still projection signal marks are recorded in a series on a still projection signal track which is in a parallel relationship to a video information track extended in a longitudinal direction on said roll film, and said film address marks are recorded on a film address track which is in a parallel relationship to the video information track and the still projection signal track.

22. A system according to claim 20 wherein said first control means includes means for making said film transporting means run faster at the time of the retrieval operation than its normal running speed, and said second control means includes means for making said tape transporting means run faster at the time of the retrieval operation than its normal running speed.

23. A system according to claim 20 wherein said first control means includes means for causing said film transporting means to selectively transport the film in the forward and backward directions in accordance with the output from said first comparing means, and said second control means includes means for causing said tape transporting means to selectively transport the tape in the forward and backward directions in accordance with the output from said second comparing means.

24. A system according to claim 20 wherein said retrieval instruction means include selection means for selectively permitting only either one of the film retrieval and the tape retrieval.

25. An apparatus for reproducing video information and audio information in synchronism with each other, comprising:

a film chamber accommodating a roll film on which the video information and a plurality of still projection signal marks and film address marks are optically recorded, said video information being recorded on the film in frame units, and each of said still projection signal marks being provided for each frame of the film for which a still picture projection should be done, and each of said film address marks being provided for a desired frame for which a retrieval operation is required;

a tape chamber accommodating a magnetic tape on which the audio information and a plurality of still projection release signal marks and tape address marks are magnetically recorded, said audio information being associated with the video information recorded on said film in frame units, and each of the still projection release signal marks being provided at such a location on the tape that the location has a corresponding relationship to the frame of the film for which the still picture projection should be done, and each of said tape address marks being provided at such a location on the tape that the location has a corresponding relationship to the desired frame of the film for which the retrieval operation is required;

video information reproduction means for reproducing the video information on said roll film, said video information reproduction means having a display unit;

audio information reproduction means for reproducing the audio information on said magnetic tape;

means for optically detecting the still projection signal marks on the film and developing corresponding film stop signals;

means for detecting the still projection release signal marks on the tape and developing corresponding film start signals;

means for transporting the film through a video information reproducing station of said video information reproducing means;

means for transporting the tape through an audio information reproducing station of said audio information reproducing means; and retrieving means comprising first address mark detecting means for detecting optically the film address marks on the film and for developing corresponding film address signals, second address mark detecting means for detecting magnetically the tape address marks on the tape and for developing corresponding tape address signals, instruction signal input means externally operable for inputting an instruction signal to indicate the desired address of the film and tape, said instruction signal input means including a keyboard having ten keys, holding means connected to said instruction signal input means for holding the instruction signal from said instruction signal input means, first comparing means for comparing the output from said instruction signal input means with the output from said first address mark detecting means, said first comparing means having a first input terminal connected to the output terminal of said first address mark detecting means, and a second input terminal connected to the output terminal of said holding means, second comparing means for comparing the output from said instruction signal input means with the output from said second address mark detecting means, said second comparing means having a first input terminal connected to the output of said second address mark detecting means, and a second input terminal connected to the output terminal of said holding means, and retrieval instruction means externally operable for instructing retrieval, said retrieval instruction means permitting entry of the outputs of said holding means and said first address mark detecting means into said first comparing means, and entry of the outputs of said holding means and said second address mark detecting means into said second comparing means, respectively;

information reproducing instruction means externally operable for instructing the reproduction of the audio information and the video information;

first control means for controlling the start and stop operation of said film transporting means, said first control means having a first input terminal connected to the output terminal of said still projection signal mark detecting means, a second input terminal connected to the output terminal of said still projection release signal mark detecting means, a third input terminal connected to the output terminal of said first comparing means, a fourth input terminal connected to the output terminal of said information reproducing instruction means, and an output terminal connected to the input terminal of said film transporting means;

second control means for controlling the start and stop operation of said tape transporting means, said second control means having a first input terminal connected to the output terminal of said second comparing means, a second input terminal connected to the output terminal of said information reproducing instruction means, and an output terminal connected to the input terminal of said tape transporting means;

whereby, in retrieval operation, said first control means is effective to retain the operation of said film transporting means until said first comparing means generates a predetermined output regardless the film start signal and the film stop signal, and said second control means is effective to retain the operation of said tape transporting means until said second comparing means generates a predetermined output, and when both video information and audio information located at the desired address are carried to the respective reproducing stations, said film transporting means and said tape transporting means are stopped in their operations so that the retrieval operation is terminated, and then the operation of said information reproducing instruction means interrupts the effective coupling of said first and second control means with said first and second comparing means, respectively, so that said film transporting means, and said tape transporting means are set in such a condition that they are operable, and thus said first control means causes said film transporting means to stop the film upon receipt of the film stop signal from said still projection signal mark detecting means, and to start the film upon receipt of the film start signal from said still projection release signal mark detecting means.

26. A system according to claim 25 wherein said retrieval means has means for providing a digital display of the input signal from said instruction signal input means and the detected address signals from said first and second address mark detecting means.

27. A system according to claim 25 wherein said holding means comprises an encoder and an input register.

28. A system according to claim 25 wherein said instruction signal input means includes clear means for clearing the signal in said holding means.

29. A system according to claim 25 wherein said film transporting means comprises a film transporting mechanism for actually transporting the film, and a driving motor mechanically linked with said film transporting mechanism; and said first control means comprises a clutch mechanism for selectively disengaging the mechanical link of said film transporting mechanism with said driving motor, clutch control means effective to enable said clutch mechanism to operate, and control circuit means for controlling said clutch mechanism.

30. A system according to claim 25 wherein said tape transporting means comprises a tape transporting mechanism for transporting the tape, and a driving motor mechanically linked with said tape transporting mechanism; said second control means comprises a clutch mechanism for selectively disengaging the mechanical link of said tape transporting mechanism with said driving motor, clutch control means effective to enable said clutch mechanism to operate, and control circuit means for controlling said clutch mechanism.

31. A system according to claim 25 wherein said first control means include means for causing said film transporting means to selectively transport the film in the forward and backward directions in accordance with the output from said first comparing means, and said second control means includes means for causing said tape transporting means to selectively transport the tape in the forward and backward directions in accordance with the output from said second comparing means.

32. A system according to claim 25 wherein said retrieval instruction means includes selection means for selectively permitting only either one of the film retrieval and the tape retrieval.

33. A system according to claim 25 wherein said first control means includes means for making said film transporting means run faster at the time of the retrieval operation than its normal running speed, and said second control means includes means for making said tape transporting means run faster at the time of the retrieval operation than its normal running speed.

* * * * *

UNITED STATES PATENT AND TRADEMARK OFFICE
CERTIFICATE OF CORRECTION

PATENT NO. : 4,027,958
DATED : June 7, 1977
INVENTOR(S) : YOSHIHIRO SHIGETA, et al.

It is certified that error appears in the above-identified patent and that said Letters Patent are hereby corrected as shown below:

Column 4, line 6, change "A NAND" to -- a NAND --; line 26, change "terminal" to -- the --; line 27, after "motor" (first occurrence) insert -- 71 --; line 30, change "47 frame, the 47g" to -- 47a-47g --.

Column 6, line 3, change "240" to -- 210 --; line 67, change "47-i" to -- 47-f --.

Column 5, line 21, change "23-b-g" to --23-b-23-g --.

Column 12, line 10, change "stops" to -- stop --; line 51, change "91" to -- 81 --.

Column 14, line 60, change "signal" (first occurrence) to -- signals --.

Signed and Sealed this

Twenty-first Day of March 1978

[SEAL]

Attest:

RUTH C. MASON
Attesting Officer

LUTRELLE F. PARKER
Acting Commissioner of Patents and Trademarks